US006457566B1

(12) United States Patent
Toby

(10) Patent No.: US 6,457,566 B1
(45) Date of Patent: Oct. 1, 2002

(54) DISK BRAKE ROTOR WITH VISUAL WEAR INDICATOR

(75) Inventor: Dennis E. Toby, Lake Geneva, WI (US)

(73) Assignee: Brake Parts Inc., McHenry, IL (US)

( * ) Notice: Subject to any disclaimer, the term of this patent is extended or adjusted under 35 U.S.C. 154(b) by 0 days.

(21) Appl. No.: 09/791,570

(22) Filed: Feb. 26, 2001

(51) Int. Cl.[7] ............................................. F16D 65/12
(52) U.S. Cl. ............................ 188/1.11 W; 188/18 A; 188/218 XL
(58) Field of Search ...................... 188/1.11 W, 1.11 R, 188/1.11 L, 218 XL, 18 A

(56) References Cited

U.S. PATENT DOCUMENTS

| | | |
|---|---|---|
| 1,949,670 A | 3/1934 | Winters |
| 2,398,006 A | 4/1946 | Hunt |
| 3,587,416 A | 6/1971 | Wainscott |
| 4,049,084 A | 9/1977 | Beemer et al. |
| 4,143,744 A * | 3/1979 | Oka ....................... 188/1.11 W |
| 5,662,192 A * | 9/1997 | Kingston et al. ...... 188/1.11 W |
| D413,093 S | 8/1999 | Johnson et al. |
| 6,279,698 B1 * | 8/2001 | Obert ..................... 188/218 XL |

* cited by examiner

Primary Examiner—Matthew C. Graham
(74) Attorney, Agent, or Firm—Oliff & Berridge, PLC

(57) ABSTRACT

A brake rotor for a vehicle is provided with one or more visual wear indicators on brake contact surfaces to allow easy visual inspection of brake rotor condition without the need for measurement tools. The inventive visual wear indicator system is not obtrusive and as such removes only a relatively small amount of brake contact surface to form a recessed surface at a depth of a predetermined minimum useable rotor thickness. With this inventive rotor, one can visually inspect the condition of a brake rotor and readily determine whether the rotor requires replacement or remachining. The visual wear indicator is provided on a brake contact surface of the rotor solely within a brake contact region so as to provide an accurate reflection of the condition of the rotor in areas where wear will occur. The visual indicator may be provided on only one, but preferably both, sides of the rotor and may take numerous forms, such as a cylindrical bore, a more complex shape, an annular groove or even an eccentric groove. For additional visibility, the visual wear indicator may be colored for additional contrast. The visual wear indicator may also be coated to prevent rusting.

18 Claims, 9 Drawing Sheets

DISK BRAKE ROTOR WITH VISUAL WEAR INDICATOR

BACKGROUND OF THE INVENTION

1. Field of Invention

The invention relates to a disk brake rotor with a wear indicator that does not adversely affect operation of the rotor yet allows easy visual inspection of wear.

2. Description of Related Art

Conventional disk brake rotors generally include a pair of mutually spaced-apart annular disks that form two opposed planar brake contact surfaces. These opposed brake contact surfaces receive braking force as applied by a brake caliper through two opposed brake pads. These rotors encounter frictional forces and heat build up each and every time the brakes are applied. Over time, these rotors (as well as the pads) wear or are damaged due to heat degradation and material fatigue caused by the cyclical application of frictional brake forces. Eventually, both the brake pads and the brake rotors become worn to a point where replacement is warranted or necessary. The full life expectancy of these brake pads and rotors cannot be determined with precision in advance as it is dependent upon many variables. In view of this, most vehicle manufacturers and brake component manufacturing companies recommend periodic inspection of brake components.

For inspection or indication purposes, brake pads routinely include metal wear indicators located to one side of the brake pad. These indicators extend along a thickness of the brake pad by a distance corresponding to a predetermined minimum wear depth. Even if the brake pads are not completely worn out, visual inspection of the brake pads can be easily performed by viewing these indicators and ascertaining whether the pads are worn sufficiently to warrant replacement. Moreover, such brake pads often exhibit an audible sound when the brakes are sufficiently worn to a point where the metal indicators contact the rotor surface during braking. More complex indicators on some vehicles activate circuits that illuminate a warning indicator when brake pads on a vehicle are worn beyond acceptable tolerances. As such, visual or audible indication of brake pad life can be rather easily determined.

The wear on brake rotors is not as readily ascertainable. Visual wear of a brake rotor is hard to ascertain. Each brake rotor is designed for a particular application and has a minimum dimensional thickness after which time the brake rotor no longer operates as desired and is susceptible to unacceptable, and perhaps even dangerous warpage, cracking or reduced braking capability. Some rotors are single use rotors, designed with relatively thin rotor surfaces. Upon sufficient wear, these rotors are intended to be replaced. Other rotors are designed with sufficient rotor thickness such that, after extended use, they can be machined or "turned" one or more times by known conventional equipment back to a smooth, flat surface to eliminate uneven wear patterns, and continue in use. This remachining of the brake contact surfaces of these rotors can be repeated until the rotor has reached a design minimum rotor thickness. As brake rotors often last much longer than the average brake pads, most people servicing brake systems visually inspect the brake pads only and do not measure the wear on the rotors until the pads require replacement.

While a rotor with a severely warped, pitted or scored contact surface may be quickly identified by a trained mechanic's eye, the remaining life of most rotors, without serious defects, cannot be so readily determnined visually. This is because the remaining life cannot be determined from a cursory review of the contact surfaces, which if the rotors are used properly, will wear down uniformly. Moreover, as different rotors have differing dimensions and minimal thickness design criteria, conventional inspection techniques have typically involved precise measurements of the rotor contact surfaces using a micrometer for both rotor thickness and rotor runout (determination of an out-of-round condition). The resultant readings determine whether the rotor: 1) needs replacement, 2) is within acceptable tolerances, or 3) has sufficient remaining thickness to be machined back to a smooth brake surface.

Such rotor inspections require expensive and properly calibrated equipment. Moreover, such inspections require knowledge of the appropriate minimum rotor thickness for a particular rotor, which is primarily determined by the rotor manufacturer. This information is often stamped on non-contact surfaces of the rotor or may be published in appropriate literature. However, such literature may be unavailable to a typical vehicle owner. Moreover, even stamped tolerances are often difficult to determnine. This is because by the time that sufficient time and braking cycles and wear have occurred to warrant inspection, rust and environmental exposure may have obscured such markings beyond recognition. Further, even upon ascertaining the proper minimum tolerance information, prior inspection techniques required precise micrometer measurements, which cannot be performed by many persons who service vehicles. As such, rapid and accurate inspection of rotors has not been attainable with conventional rotor technology.

Thus, there is a need for a brake rotor that is capable of visual inspection to determine remaining useful life or uneven wear.

SUMMARY OF THE INVENTION

The invention overcomes the problems with the prior art by providing a visual indicator of rotor condition without the need for measurement tools.

These and other objects of the invention are overcome by a brake rotor for a vehicle brake system having a visual wear indicator, comprising: a central hub rotatably mountable to a vehicle for rotation about an axis; and at least one radially extending annular disk extending radially from the central hub, the at least one annular disk including inboard and outboard planar brake contact surfaces, the inboard and outboard brake contact surfaces being of a predetermined surface roughness, wherein at least one visual wear indicator is formed on at least one of said inboard and outboard brake contact surfaces solely within a brake contact region of the brake contact surfaces that will be worn due to brake pad contact during use, the visual wear indicator including a recessed surface substantially parallel to the brake contact surface that is at a depth corresponding to a minimum useable thickness of the rotor.

These and other objects are also achieved by a method of forming a visual wear indicator on a brake rotor, comprising the steps of: forming a brake rotor with a central hub rotatably mountable to a vehicle and at least one radially extending annular disk extending radially from the central hub, the at least one annular disk including inboard and outboard planar brake contact surfaces rotatable about an axis of rotation; forming at least one visual wear indicator on at least one of said inboard and outboard brake contact surfaces solely within a brake contact region of the brake contact surfaces that will be worn due to brake pad contact during use, the visual wear indicator including recessed surface substantially parallel to the brake contact surface that is at a depth corresponding to a minimum useable thickness of the rotor; and processing the inboard and outboard brake contact surfaces to have a predetermined surface roughness.

It is believed that for best retention of braking benefits, a visual wear indicator system is needed that is not obtrusive. That is, the wear indicator should not remove much rotor material, so as to maximize rotor mass and surface area. Moreover, the visual wear indicator needs to be provided on a contact surface of the rotor that is contacted by the brake pad so as to be an accurate reflection of rotor surface wear.

The inventive visual wear indicator in a first embodiment of the invention takes the form of a simple counterbore formed on an exterior contact surface of the rotor intermediate radial extremities of the contact surface. Such a location is selected so as to be within an area that is contacted by a brake pad. There may be a counterbore provided diametrically opposite the first bore. This may assist in rotor balancing, but may be unnecessary if the amount of material removed is minimal. The counterbores are preferably formed on opposite surfaces (i.e., one on the outboard rotor surface and one on the inboard rotor surface), but may be formed on the same side. If provided on the same side, they should be provided on both the outboard and inboard rotor surfaces so that both surfaces can be visually checked for wear.

The inventive visual wear indicator in a second embodiment of the invention takes the form of an annular groove provided in the rotor contact surface. Such an annular groove is preferably formed on both the inboard and outboard rotor surfaces so that both surfaces can be inspected for wear.

Alternative exemplary embodiments are also provided and described.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 1:
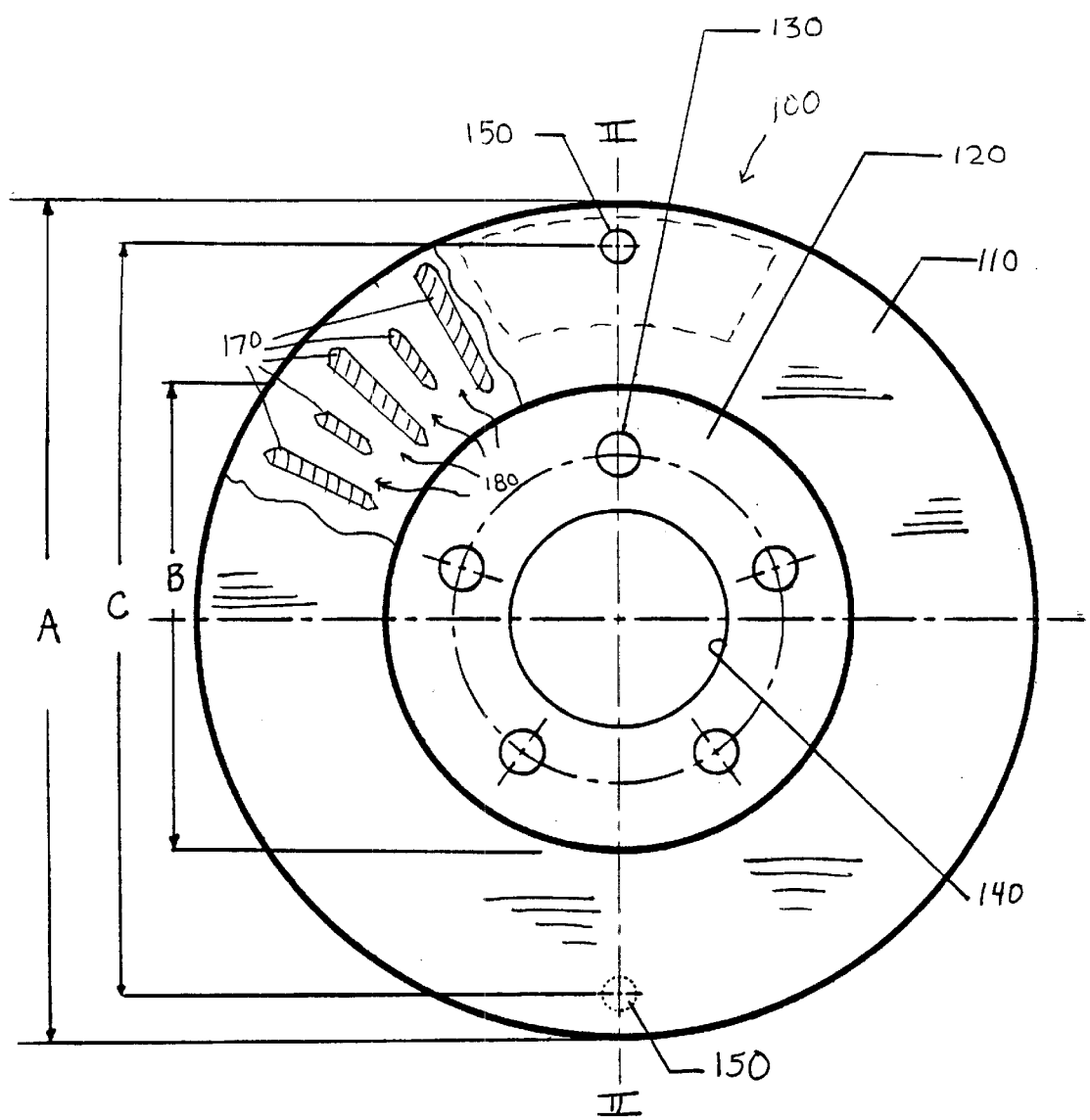
FIG. 1 is a side view of a brake rotor according to a first embodiment of the invention.
Figure 2:
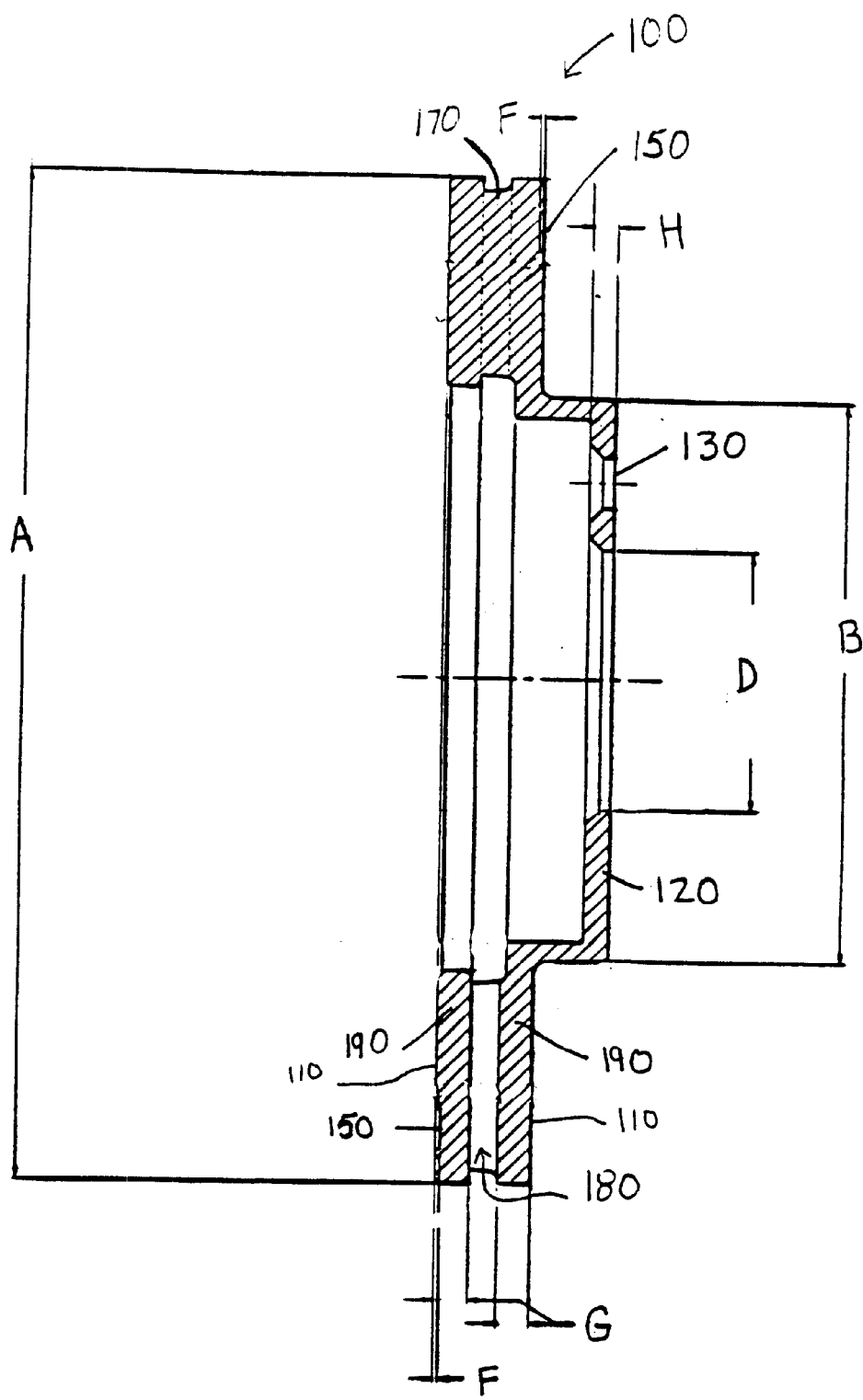
FIG. 2 is a cross-sectional view of the brake rotor of FIG. 1 taken along line 2—2.

A first embodiment of the invention will be described with reference to FIGS. 1–2, in which a brake rotor 100 is shown having two opposed brake contact surfaces 110 of a diameter A formed on annular disks 190, a center mounting hub 120 of a diameter B having mounting features 130 circumferentially spaced about a central axis, a central aperture 140 of a diameter D, and one or more visual wear indicator bore(s) 150 located within a brake region 160 at radius C/2 from the central axis.

Aperture 140 of rotor 100 accommodates mounting on an extending shaft of a wheel axle or steering hub of a vehicle, such as an automobile, truck, motorcycle or other land vehicle, i.e., the shaft is received within aperture 140. Mounting features 130 on mounting hub 120 are typically a through bore sized to receive an appropriate wheel stud. Such bores usually have a conventional configuration, such as 4, 5, 6, 8 or more through bores equally spaced about the center axis at a predefined bolt circle diameter. For example, an exemplary embodiment is shown with a 5 bolt pattern spaced on a 4.250" bolt circle, which is a conventional configuration for many U.S. vehicles. However, other conventional mounting features can be readily substituted as these features do not form an essential part of the invention.

Brake rotors 100 are usually formed or molded from cast iron, but have recently been formed of other metals and composite materials, such as aluminum, titanium, carbon fiber, and impregnated polymer composites. The exact material is not critical to the invention and may be any conventional or subsequently developed composition found suitable as a brake rotor surface. Preferably, but not necessarily, the rotor is of a unitary construction formed of a single material, which may be a composite steel or other suitable material.

At least one and preferably two radially extending axial disks 190 extend from hub 120 and form brake contact surfaces 110. These disks are usually molded to a certain overdimension (i.e., increased thickness) and then precision machined by known conventional milling machinery to have industry defined planar contact surfaces of (1) a certain surface roughness, such as, for example 125 Ra, and (2) dimensional accuracy (lateral runout). However, the inventive brake rotors 100 are further formed with one or more visual wear indicator bores 150 on at least the outboard contact surface 110 and preferably on both outboard and inboard contact surfaces 110 as shown.

The ability of the brake rotor 100 to dissipate heat generated by the braking forces is critical to proper operation of the braking system. Brake rotors are essentially a heat sink. As logic dictates, a larger brake rotor is generally able to accommodate more heat dissipation. However, as the diameter of rotors is often limited by the wheel size and the like in vehicles, brake rotors typically are provided with an internal vane structure, best shown in FIGS. 1–2, that consists of thin, spaced radially extending vanes 170 between the two annular disks 190 that define the contact surfaces 110. Air flow paths 180 are defined between adjacent vanes 170 that assist in air cooling of the rotors. Details of such vanes structures are well known and do not form an essential part of the invention. Accordingly, further description is omitted.

Because bigger rotors accommodate more cooling, most brake rotors have a full contact face surface (surface 110) to maximize rotor mass, contact surface area and associated heat transfer and dissipation properties. However, some rotor designs of recent years have begun implementing different configurations, including "cross-drilled" designs that attempt to improve cooling and slotted rotors that attempt to improve brake pad cleaning.

With such cross-drilled designs, a series of through bores are drilled all the way through one or both of the annular disks 190 to provide an air flow path from the exterior contact surfaces of the rotor to the interior air flow paths of the internal vane structure. While such through bores increase rotor cooling efficiencies, these through bores may present other problems, such as compromised rotor integrity and increasing the risk of stress cracks. Moreover, if too much material is removed, heat dissipation or other braking properties may be compromised. Such through bores, however, regardless of their effectiveness at brake cooling, cannot serve as wear indicators because the bores go all the way through annular disks 190.

The need for a visual wear indicator for brake rotors is discussed above. However, the braking efficiency of the rotor visual wear indicator should not be obtrusive to maximize the efficiency of the rotor. That is, the indicator should not require removal of a large amount of rotor material, to maximize rotor mass and surface area. Moreover, the visual wear indicator(s) 150 needs to be provided on the contact surface 110 in a braking region contacted by a brake pad during use, as it is only this area that is subject to wear.

There are several possible configurations for the inventive visual wear indicator 150. In a first embodiment, shown in FIGS. 1–2, the inventive visual wear indicator 150 is a simple counterbore formed partially into contact surface 110 at a location intermediate radial extremities of contact surface 110. That is, the location is selected to have a radius C/2 that is greater than B/2 and less than A/2 so as to be within a braking contact area contacted by a brake pad, shown in outline form as element 160, as rotor 100 rotates between opposing brake pads. The size and shape of the counterbore is selected so as to remove only a small amount of rotor material.

This reduces the possible detrimental effect of the counterbore on the brake system, e.g., drag, noise, rotor balance and the like.

By making the counterbore cylindrical as shown, a very economical manufacturing process can be used to form the counterbore. For example, the formed rotor may be fixedly mounted and a simple machine tool such as a drill press with a rotating bit moveable in a single degree of freedom (translatable in one plane) can be used to form the hole. A suitable counterbore may have, for example, a diameter of approximately 0.4" (11 mm). While the exact size is not critical, the depth of the .visual wear indicator is critical as the thickness of the rotor material at the bottom of the counterbore must correspond to a desired minimum useable rotor thickness contemplated by the manufacturer.

In its simplest form, the visual wear indicator 150 can consist of a single cylindrical counterbore, provided in the outboard brake contact surface 110. In such a case, it can be presumed that wear on both inboard and outboard brake contact surfaces 110 will be substantially the same. However, as this is not always the case, it is more preferable to provide at least one visual wear indicator 150 on each of the inboard and outboard brake contact surfaces 110, as shown. Because the amount of material removed in this embodiment is negligible in the context of total rotor mass, on the order of one gram, the visual wear indicators can be provided in the same location(s) on each contact wear surface 110. However, it may be advantageous to provide the visual wear indicators 180° from each other (diametrically opposite each other) as shown in FIGS. 1 and 2 so as to maintain better rotor balance. However, this may only have significance if the amount of material is relatively large or the weight of the rotor is significantly reduced.

Figure 3:
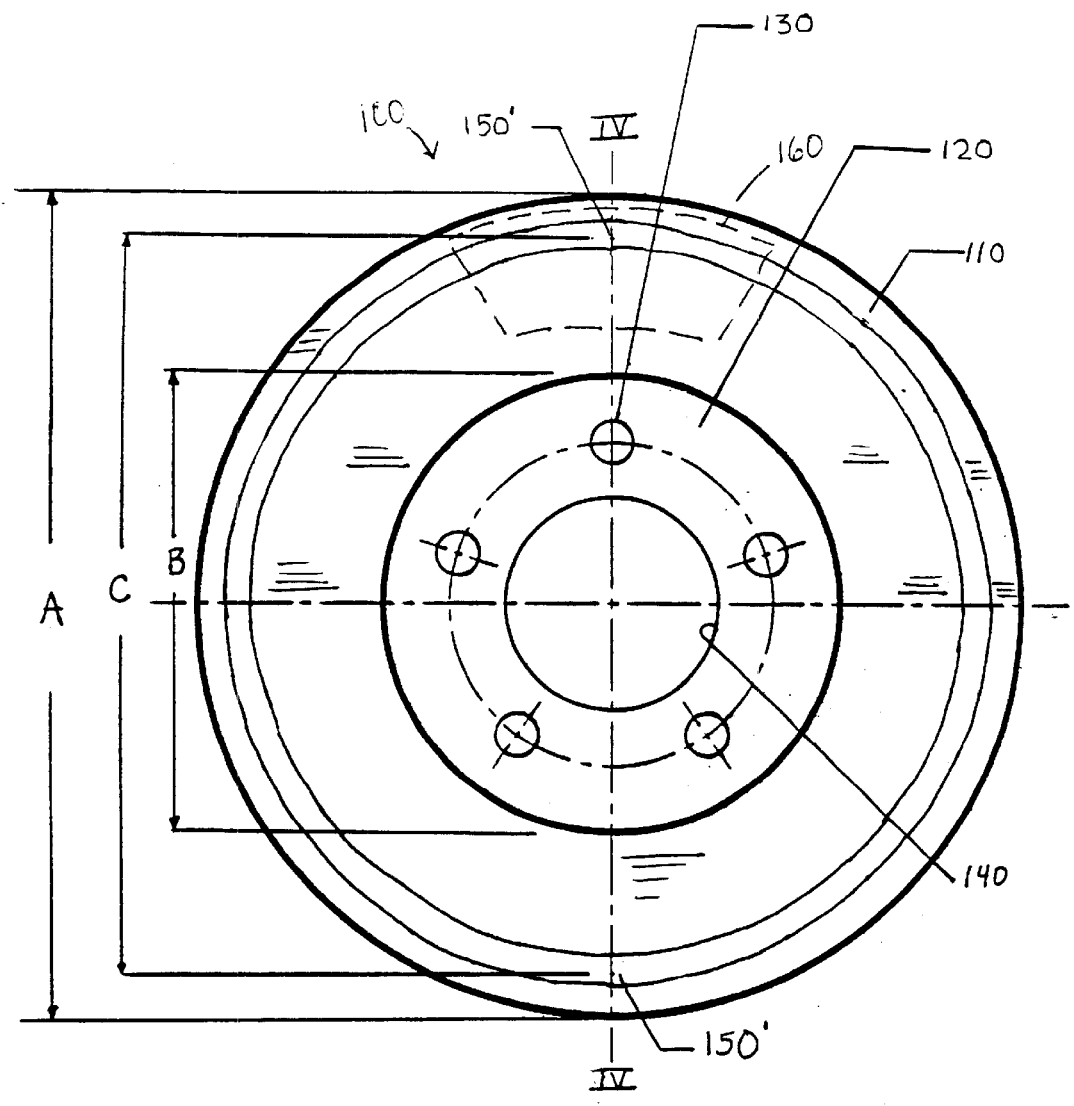
FIG. 3 is a side view of a brake rotor according to another invention of the invention.
Figure 4:
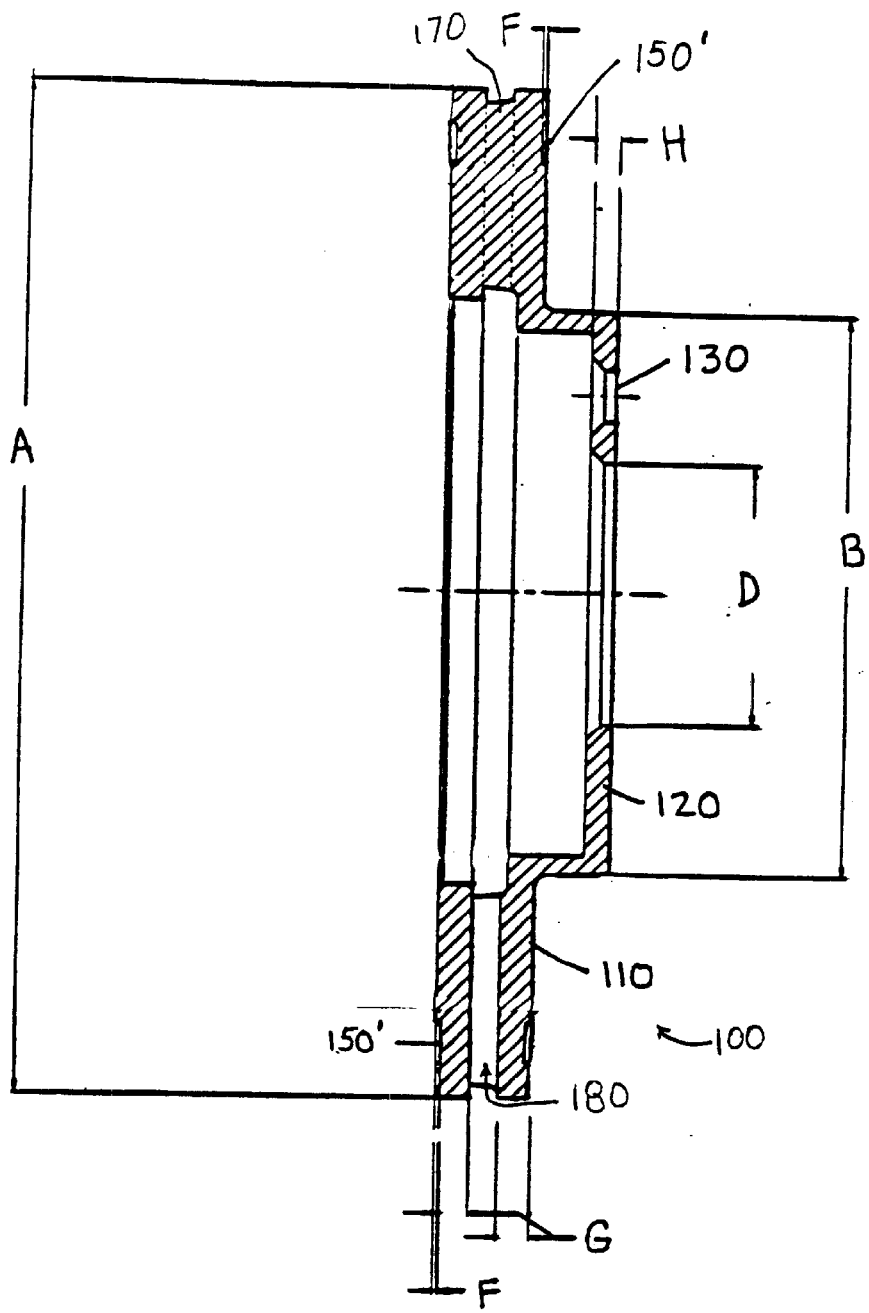
FIG. 4 is a cross-sectional view of the brake rotor of FIG. 3 taken along line IV—IV.

In the first embodiment, a single isolated visual wear indicator is provided, preferably on each brake contact surface 110. However, it may be desirable to visually gauge wear around the entire periphery of the rotor. An exemplary embodiment of such is shown in FIGS. 3–4 where instead of a single isolated bore, a narrow annular groove 150' is provided that is substantially concentric with hub 120 and the axis of rotor rotation. This provides an enhanced visual wear indicator that can be used to visually ascertain the condition of the rotor at various locations about the rotor surface. Such an embodiment is capable of identifying not only overall wear, but is capable of determining runout problems (i.e., where the rotor is experiencing uneven wear patterns). This groove 150' should, like bore 150, have a depth such that the thickness of the rotor material at the bottom of the groove corresponds to the minimum useable rotor thickness contemplated by the manufacturer. Also, the width of the groove should be quite small to reduce effect on braking and adverse problems with brake pad contact. A typical exemplary width can be between $1/16"-3/16"$ wide. As in the first embodiment, annular groove 150' may be provided on each of the inboard and outboard brake contact surfaces 110 and must be located within a brake contact region that is contacted by brake pads 160 during use (i.e., radially located between a lowermost and an uppermost contact edge of brake pad 160 when installed).

This embodiment also can be manufactured at a relatively inexpensive cost. For example, rotor 100 may be mounted on a rotary jig and a fixed machine tool having a drill bit that is translatable in one dimension is positioned to a desired location and advanced into the rotor to the desired depth while the rotor is rotated by the rotary jig to form the annular groove 150' on rotor 100.

Figure 5:
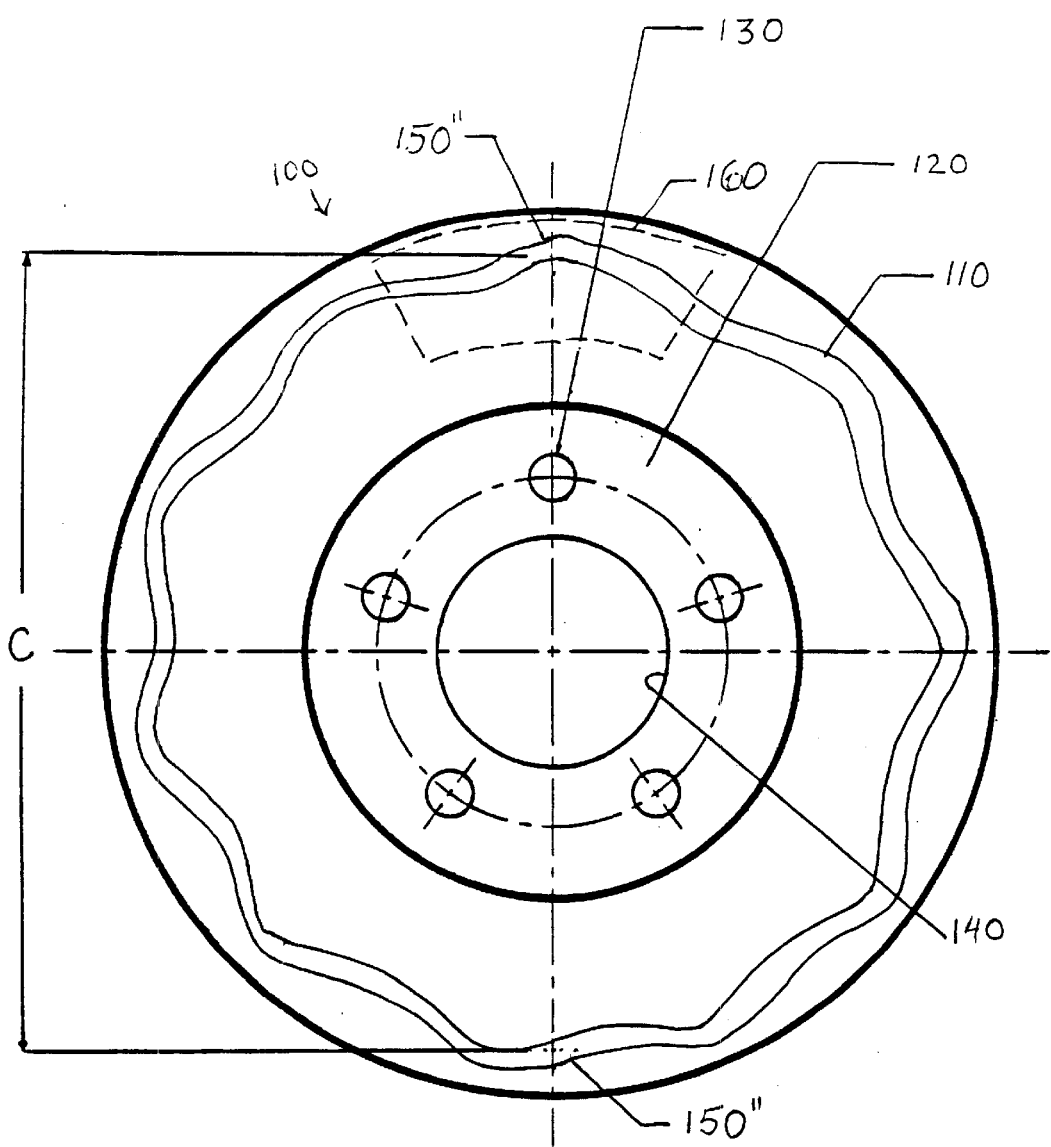
FIG. 5 is a side view of a brake rotor according to a further alternative embodiment of the invention.

Even though the annular groove has minimal width and thus has only limited contact with the brake pad surface, it may be possible that, after extended use, an annular ridge may develop on the brake pads due to the repeated interaction of the brake pad with the annular groove at the same radial location. Such a ridge may create undesirable noise. To avoid this potential problem, the visual wear indicator may be shaped as an eccentric groove 150" that is still substantially concentric with the axis of rotation. See FIG. 5. The exact shape of eccentricity can be varied as desired and does not have to be as complex as that shown. However, the primary purpose of the eccentricity is to vary the radial point of contact with the brake pads during rotation to avoid the formation of an annular ridge.

The formation of an eccentric groove requires additional machining costs. One exemplary possible manufacture technique would be to provide a bit on a drill jig that is translatable radially and mounting the rotor on a rotatable jig such that during rotation, the bit is translated radially inward or outward to form the eccentric pattern. Alternatively, the groove can be formed by using a multiple axis CNC machine.

Other variations of an eccentric groove that would eliminate the potential for the formation of annular ridges, as discussed above are an annular groove as in FIG. 3 that is slightly offset from the axis of rotation and an oval groove.

Figure 6:
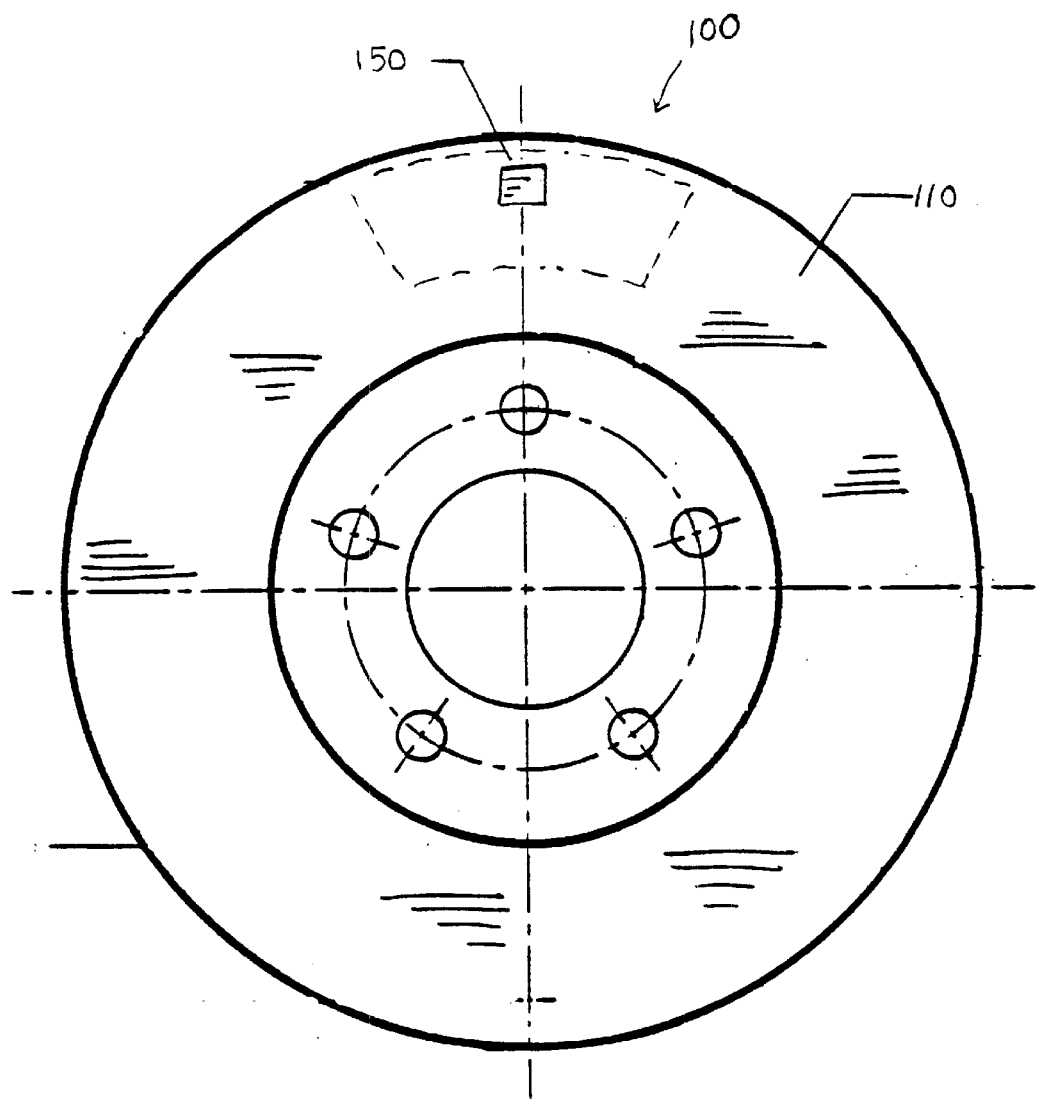
FIGS. 6–9 are illustrative additional exemplary visual wear indicator configurations according to the invention.
Figure 7:
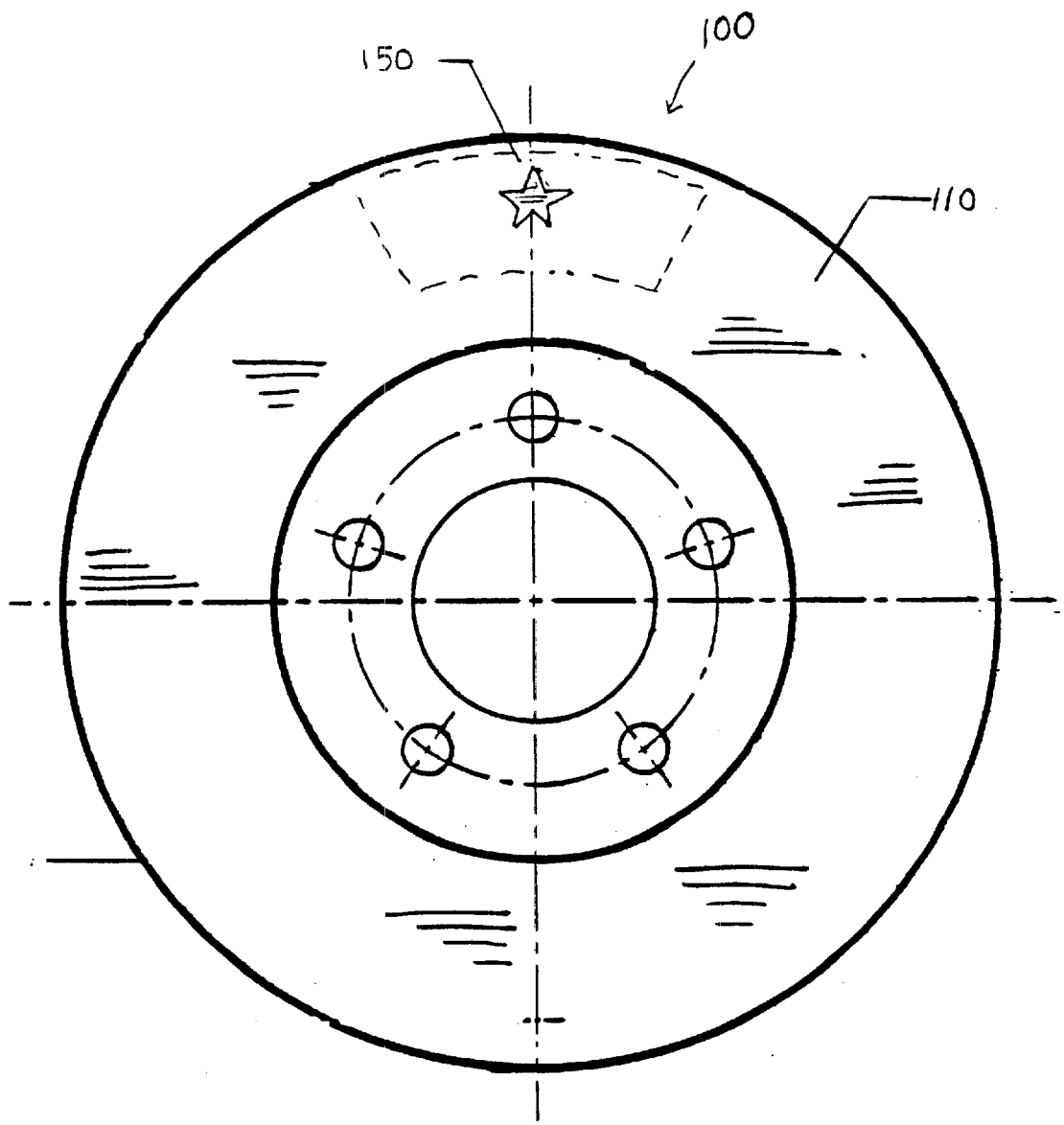
Figure 8:
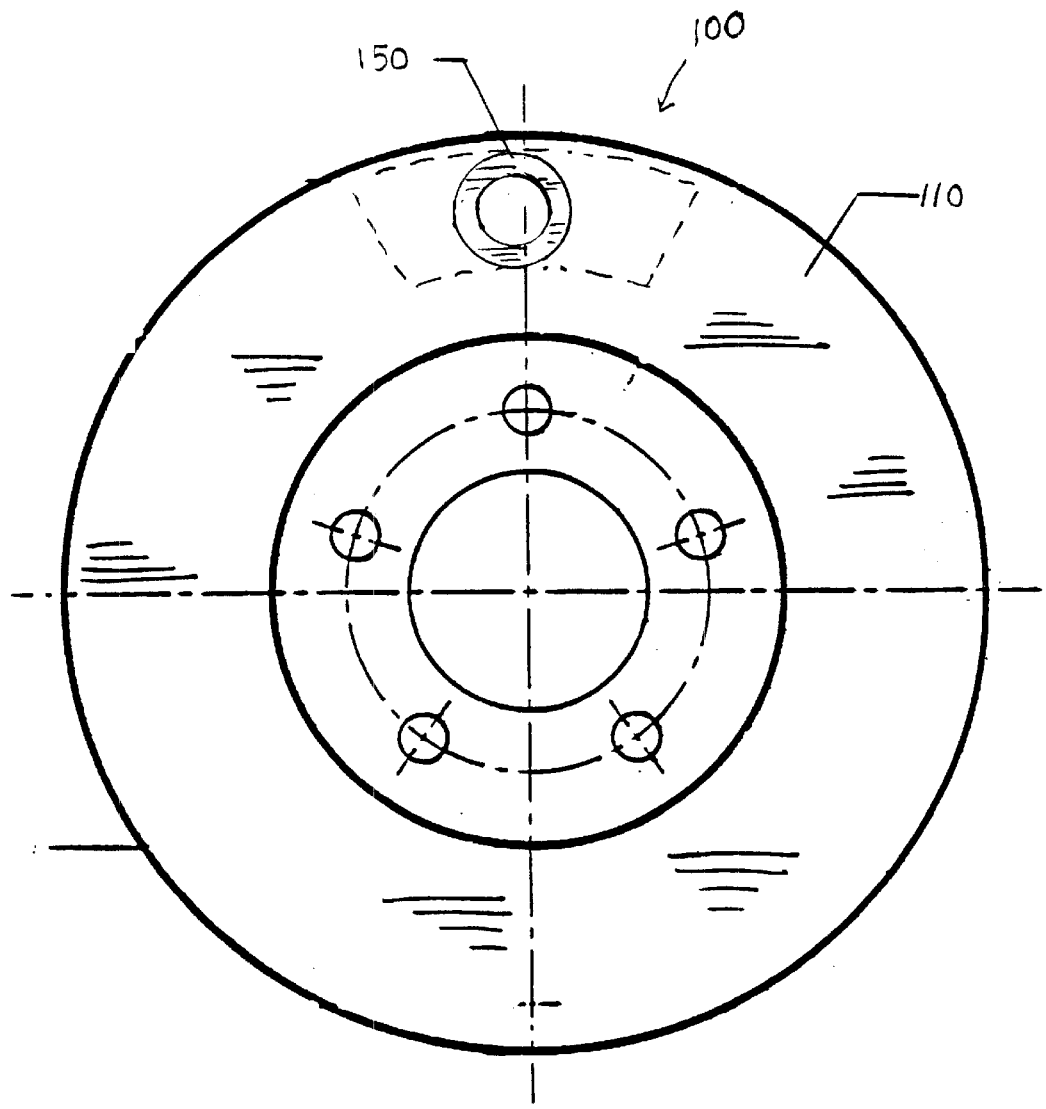
Figure 9:
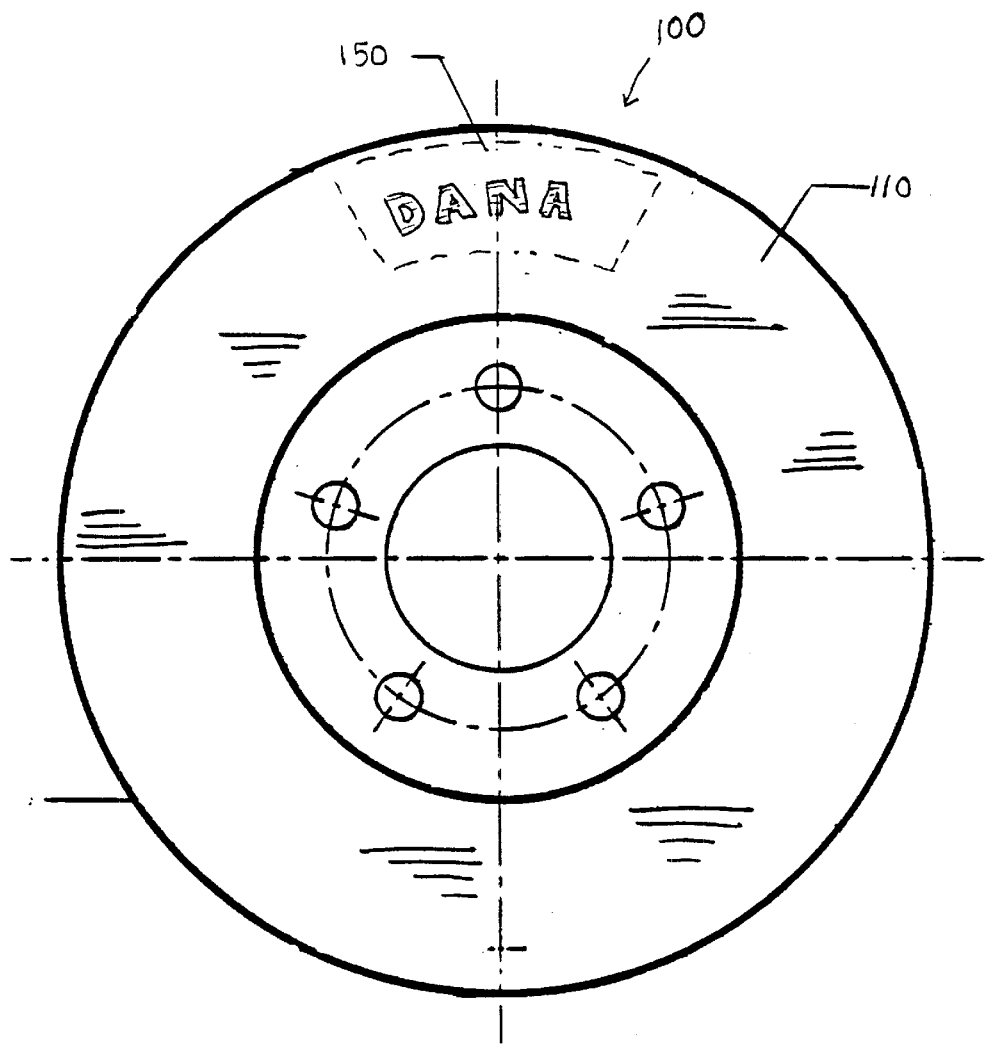

The invention as described is not limited to the specific embodiments described. Instead, the inventive visual wear indicator and rotor can have various other configurations, such as, for example, those shown in FIGS. 6–9. That is, instead of a simple cylindrical counterbore or annular groove, the counterbore may be square as in FIG. 6. The indicator may also take the form of a more complex shape or shapes, such as the star form in FIG. 7, the hollow milling design in FIG. 8, or even a custom insignia or logo, such as that shown in FIG. 9. The shape of the indicator is not overly important, rather, the location and depth of the visual wear indicator are the critical parameters. That is, the wear indicator should only be provided in a location that is fully contacted by a brake pad during use so that the indicator is a proper indicator of rotor wear in the region that forms a braking surface. Additionally, the wear indicator should have a recessed surface that is substantially parallel to the brake contact surface and the depth of the rotor material at the bottom of the indicator should be equal to or greater than the predetermined minimum useable thickness of the rotor, so as to indicate when the rotor has worn to a point where it is no longer serviceable.

While not necessary, it is also contemplated that such visual wear indicators 150 may be painted, coated, anodized or the like so as to visually contrast from the remainder of the rotor surface, which in most cases is a dull, polished metallic finish. For example, the wear indicator surface can be applied with a coat of a highly visible or contrasting color, such as red. Obviously, when such coating is to be used, the counterbore depth must be accordingly adjusted to accommodate for a predetermined thickness of the paint or other colored coating. Such a colored coating can have multiple purposes. When the rotor is new, it provides a distinct visual cue that this rotor is different from normal rotors and has the inventive visual wear indicators. Second, as is known, metallic rotors rust during use and exposure to elements. Thus, only those surfaces that are worn down by contact with the brake pads are free of such rust. By coating the wear indicator surface, this surface can be protected from rust build up, which could effect the proper visual indicator function. Further, even to the extent that rust may accumulate on top of the coated visual wear indicator, when the rotor is worn to the true limit of the wear indicator, any such rust or accumulation will be scraped off by the contact with the brake pads until the coating shows through to give a contrasting visual indication that the rotors are worn, which indication may otherwise be obscured if the coating is not provided.

While the systems of the invention have been described in conjunction with the specific embodiments outlined above, it is evident that many alternatives, modifications and variations will be apparent to those skilled in the art. Accordingly, the exemplary embodiments are intended to be illustrative, not limiting. Various changes may be made without departing from the spirit and scope of the invention.

What is claimed is:

1. A brake rotor for a vehicle brake system, comprising:
   a central hub rotatably mountable to a vehicle for rotation about an axis; and
   at least one radially extending annular disk extending radially from the central hub, the at least one annular disk including inboard and outboard planar brake contact surfaces,
   at least one visual wear indicator formed as a depression in at least one of said inboard and outboard brake contact surfaces located at a portion of the brake rotor intermediate the central hub and a radial extremity solely within a brake contact region, the visual wear indicator including a recessed surface substantially parallel to the brake contact surface at a depth such that the thickness of the annular disk below the recessed surface corresponds to or is greater than a predetermined minimum useable thickness of the annular disk.

2. The brake rotor of claim 1, wherein the at least one wear indicator is provided on both of the inboard and outboard brake contact surfaces.

3. The brake rotor of claim 2, wherein the visual wear indicator on the inboard brake contact surface is substantially diametrically opposed to the visual wear indicator on the outboard brake contact surface.

4. The brake rotor of claim 1, wherein at least a bottom surface of the visual wear indicator parallel with the planar brake contact surface is coated to protect the indicator from rusting or other environmental degradation.

5. The brake rotor of claim 1, wherein the at least one wear indicator is a cylindrical counterbore.

6. The brake rotor of claim 1, wherein the at least one wear indicator has a complex shape that is dimensionally smaller than a brake pad surface area.

7. The brake rotor of claim 1, wherein the at least one visual wear indicator is in the form of a recessed annular groove that is substantially concentric with the axis of rotation of the rotor.

8. The brake rotor of claim 1, wherein the at least one visual wear indicator is in the form of an eccentric groove substantially concentric with the rotor axis.

9. The brake rotor of claim 1, wherein at least a bottom surface of the visual wear indicator parallel with the planar brake contact surface is of a color that contrasts with a color of the remaining brake contact surface to enhance visibility of the wear indicator.

10. A method of forming a visual wear indicator on a brake rotor, comprising the steps of:
    forming a brake rotor with a central hub rotatably mountable to a vehicle and at least one radially extending annular disk extending radially from the central hub, the at least one annular disk including inboard and outboard planar brake contact surfaces rotatable about an axis of rotation; and
    forming at least one visual wear indicator as a depression on at least one of said inboard and outboard brake contact surfaces located at a portion of the brake rotor intermediate the central hub and a radial extremity solely within a brake contact region of the brake contact surfaces that will be worn due to brake pad contact during use, the visual wear indicator including a recessed surface substantially parallel to the brake contact surfaces at a depth such that the thickness of the annular disk below the recessed surface corresponds to or is greater than a predetermined minimum useable thickness of the annular disk.

11. The method of claim 10, further comprising a step of coating at least a bottom surface of the at least one visual wear indicator to protect the indicator from environmental degradation.

12. The method of claim 10, further comprising a step of coloring the at least one visual wear indicator a color that contrasts with a color of the remaining brake contact surface to enhance visibility of the wear indicator.

13. The method of claim 10, wherein the step of forming the at least one visual wear indicator forms the at least one wear indicator on both of the inboard and outboard breake contact surfaces.

14. The method of claim 13, wherein the step of forming the at least one visual wear indicator forms the visual wear indicator on the inboard brake contact surface to be substantially diametrically opposed to the visual wear indicator on the outboard brake contact surface.

15. The method of claim 10, wherein the step of forming the at least one visual wear indicator forms the depression in the shape of a cylindrical bore.

16. The method of claim 10, wherein the step of forming forms the depression to have a complex shape that is dimensionally smaller than a brake pad surface area.

17. The method of claim 10, wherein the step of forming the depression forms the at least one visual wear indicator in the form of an annular groove that is substantially concentric with the axis of rotation of the rotor.

18. The method of claim 10, wherein the step of forming the depression forms the at least one visual wear indicator in the form of an eccentric groove substantiallY concentric with the rotor axis.